Patented Aug. 16, 1938

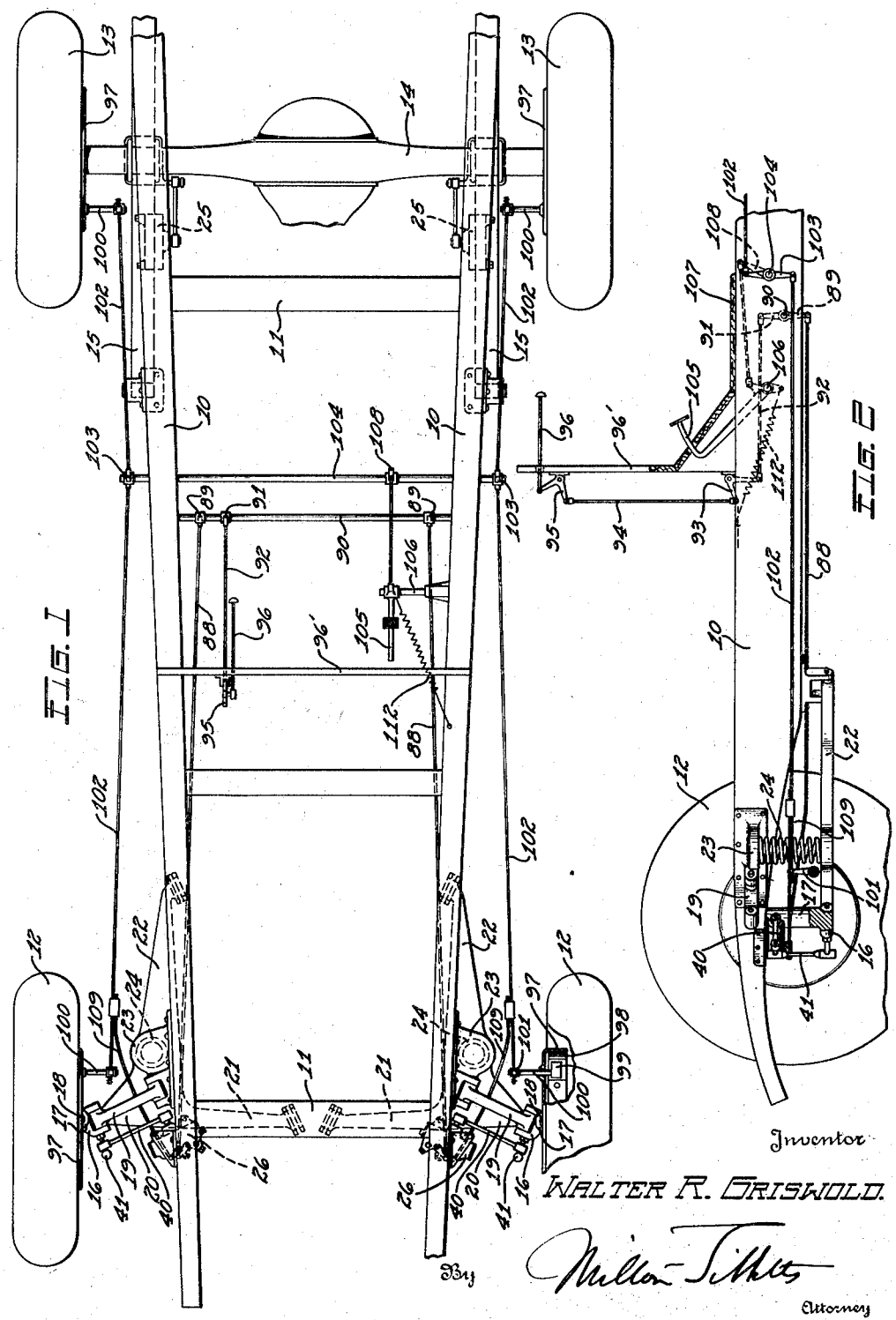

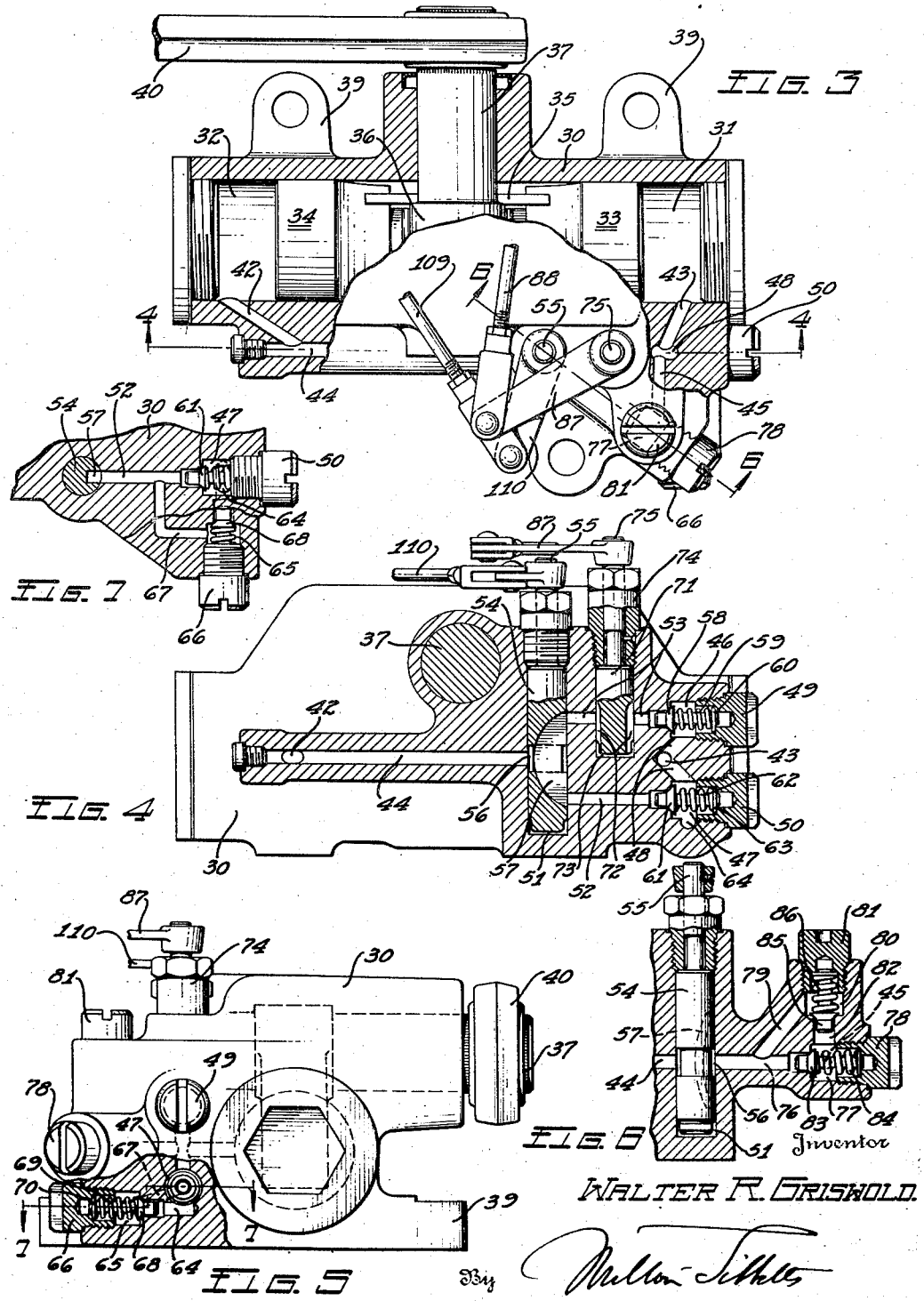

2,127,294

UNITED STATES PATENT OFFICE 2,127,294

MOTOR VEHICLE BRAKING MECHANISM

Walter R. Griswold, Detroit, Mich., assignor to Packard Motor Car Company, Detroit, Mich., a corporation of Michigan Application July 26, 1934, Serial No. 737,026

27 Claims. (Cl. 188—2)

This invention relates to motor vehicles and more particularly to suspension mechanism for motor vehicles.

It is customary in motor vehicles to provide spring suspension means between the wheel carriers and the body supporting frame. Motor vehicles are also generally equipped with shock absorbers which can be regulated to vary the resistance offered to vertical movement of the wheel carriers and the frame relatively.

In order that the ride in the vehicle will be comfortable, it is customary to have the springs relatively flexible, or "soft", and to set the shock absorbers so that they resist spring deflection only a necessary amount. With such vehicle suspension, application of the brakes tends to cause the body to move downwardly at the front end, that is to dive, and the amount of diving varies in accordance with the flexibility of the suspension system. This diving of the body is objectionable from a standpoint of riding comfort and it is dangerous because of difficulty in steering at such times as it occurs.

An object of this invention is to provide a vehicle suspension system having flexibility without the above mentioned objections occurring when the brakes are applied.

Another object of the invention is to provide a motor vehicle suspension system in which shock absorber resistance to vertical movement between the body and the wheels relatively is increased during application of the brakes.

Still another object of the invention is to provide hydraulic shock absorbers for motor vehicles in which the fluid flow is regulated by the brake applying and releasing mechanism.

Other objects of the invention will appear from the following description taken in connection with the drawings, which form a part of this specification, and in which:

Fig. 1 is a plan view, partly in section and partly broken away, of a motor vehicle chassis having my invention incorporated therewith;

Fig. 2 is a side elevational view of the forward end of the same with one of the wheels broken away in order to more clearly illustrate the suspension system;

Fig. 3 is a plan view, partly broken away and partly in section, looking at the bottom of a front shock absorber as assembled in Fig. 1;

Fig. 4 is a sectional view of a shock absorber taken on line 4—4 of Fig. 3;

Fig. 5 is an end elevational view of a front shock absorber, partially broken away to illustrate one of the control valves;

Fig. 6 is a sectional view taken on line 6—6 of Fig. 3;

Fig. 7 is a sectional view taken on line 7—7 of Fig. 5.

Referring now to the drawings by characters of reference, side sills 10 and cross brace members 11 form a relatively rigid motor vehicle main frame. Associated with the frame are front steering road wheels 12 and rear traction road wheels 13, the last mentioned wheels having drive mechanism within the axle housing 14 connected therewith in a conventional manner.

Between the frame and the road wheels is provided a suspension system consisting generally of spring means and fluid shock absorbers. The rear axle housing 14 is fixed to a central portion of a pair of longitudinally extending leaf springs 15, such springs being connected to the side sills 10 in the conventional manner.

The steering wheels are shown as independently connected with the main frame. Each wheel supporting structure includes an axle yoke 16 to which a knuckle 17 is pivotally connected by a king pin 18, the knuckle being provided with the usual spindle on which the wheel is rotatably mounted. A pair of superposed connectors 19 and 20 are pivoted at one end to each yoke, the upper connectors 19, which are in the form of links, being pivoted at their inner end to the adjacent side sill of the frame. The lower connectors 20 are triangular in form, each having a leg 21 pivoted at its end to the front cross frame member and a rearwardly extending leg 22 pivoted to the adjacent side sill of the frame. A bracket 23 projects laterally from each side sill above the lower connectors 20 and coil springs 24 are mounted therebetween.

Between the rear axle 14 and the side sills of the main frame are shock absorbers 25 which can be of any conventional type but are preferably of the hydraulic type. Between each steering wheel supporting structure and an adjacent portion of the main frame is arranged a shock absorber 26 having an adjustable feature whereby resistance to vertical movement of the frame and the wheels respectively can be varied or substantially shut off.

The same characters of reference will apply to both front shock absorbers and I will now describe one of them. The casing 30 is formed with two axially aligned horizontally extending chambers 31 and 32 in which pistons 33 and 34 are mounted for reciprocation. The pistons are secured to move in unison by means of a connector 35 and between the adjacent ends of the pistons is a cam head 36 forming one end of shaft 37 which projects through the wall of the casing. The shock absorber is fixed to the main frame by means of bolts 38 which pass through openings in brackets 39 projecting from the casing. An arm 40 is fixed to the end of the shaft projecting from the casing and a link 41 connects the arm with the axle yoke 16. Relative vertical movement of the frame and front wheel supporting structures will transmit a similar movement to links 41 which will rock the shaft and turn the cam end thereof so that the pistons will be reciprocated in the casing.

Communication is established between the ends of the chambers 31 and 32 through a series of passages and valve means located in and carried by the shock absorber casing. A passage 42 leads from the chamber 32 and a passage 43 leads from the chamber 31. The passage 42 joins the passage 44 extending parallel with the axis of the chambers while the passage 43 connects with an angular passage 45 extending substantially transversely to the axis of the pistons. A pair of chambers 46 and 47 are formed in the end of the casing adjacent the passage 43 and are connected therewith by the passage 48. These chambers are closed at their outer ends by screw plugs 49 and 50 which are axially adjustable in the end wall of the casing. The chamber 47 is connected with the valve chamber 51 by means of a passage 52 and leading from the chamber 46 to the valve chamber 51 is a passage 53. The passage 44 also connects with the valve chamber 51 and the valve 54 in such chamber is formed to control communication between the passage 44 and the passages 52 and 53 so that flow between the chambers 31 and 32 will be either established or cut off. The valve 54 is rotatably mounted in the chamber 51 and an end 55 projects exteriorly of the casing for the purpose of connection with adjusting mechanism, a suitable bushing 55' being employed to retain this valve axially in the casing. The valve is formed with a circular recess 56 which is open to the passage 44 and it is also provided with an axially extending slot 57 of sufficient length to establish communication between the passages 52 and 53, such slot intersecting the annular groove. It is obvious that rotation of the valve 54 will establish communication between the passage 44 and the passages 52 and 53 or it will cut off such communication.

In the chamber 46 is a valve member 58 having a head engaging the shoulder at the junction of the passage 53 and the end of the chamber adjacent thereto, such valve being normally seated by a coil spring 59 which is held in compression through engagement with the valve head and a washer or retainer 60 bearing against the inner end of the plug 49. There is a similar valve 61 in the chamber 47 and it is provided with a head portion which engages the shoulder at the junction of the passage 52 and the chamber 47. This valve also has a head normally seated by a spring 62 which bears against the valve head and a washer or retainer 63 seated against the inner end of the plug 50. These valves 58 and 61 open and close in the same direction but the spring 62 exerts much greater force than does the spring 59.

Communicating with the chamber 47 is a passage 64 which leads to a chamber 65 closed at its outer end by an axially adjustable screw plug 66. The passage 52 and the chamber 65 are connected by passage 67. In the chamber 65 is a valve 68 which seats against the shoulder formed by the junction between the chamber 65 and the passage 64, such valve being normally held closed by a spring 69 which engages the valve head and a retainer 70 bearing against the inner end of the plug 66. The force exerted by this spring is similar to that exerted by the spring 62. This valve 68 opens in a direction opposite to that in which the valves 58 and 61 open.

When the valve 54 is adjusted so that the slot 57 registers with the passages 52 and 53, then such passages will be in communication with the passage 44 and fluid can pass from the chamber 31 to the chamber 32 through the passages 43 and 48, the chamber 47, the passage 64, the chamber 65, passages 67, 52, 44 and 42. Likewise with the valve 54 regulated as just stated, fluid can move from the chamber 32 to the chamber 31 through passages 42, 44 and 52, the chamber 47, and passages 48 and 43 and it can also flow from the passage 44 through the passage 53, the chamber 46, and the passages 48 and 43. Small rebound vertical movements of the wheel supporting structure and the frame relatively will cause the piston 34 to move toward the left, as viewed in Fig. 3, creating pressure against the fluid in the shock absorber to open the valve 58 so that small flow can pass thereby and, under such circumstances, the spring 62 will not permit opening of the valve 61. When such relative vertical movement obtains greater proportions, then the piston 34 will create sufficient pressure against the fluid in the shock absorber 32 to open both valves 61 and 58. When the piston 33 is moved toward the right, as viewed in Fig. 3, it will force the valve 68 open so that flow will be had, as above described. Movement of the piston 34 toward the left will take place on rebound movement of the wheel supporting structure and the frame relatively, whereas movement of the piston 33 toward the right will take place on compression or movement of the wheel supporting structure and the frame. By adjusting the screw plugs 49, 50 and 66 axially, the spring force which must be overcome by fluid pressure to open the associated valves can be adjusted.

The valve 71 is interposed in the passage 53 and one end is formed with a pair of oppositely disposed milled grooves 72 in the periphery, such grooves extending in an axial direction. The milled end of the valve 71 is assembled short of the end of the chamber 73 so that fluid can flow around the end of the valve from one groove to the other and thus connect the two parts of the passage 53. This valve is retained in its chamber by bushing 74 and one end 75 thereof projects beyond the casing for the attachment of control mechanism. By turning the valve 71, the size of the passage 53 communicating with the slots 72 can be adjusted and thereby regulate the flow of fluid so that the resistance offered to relative movement between the wheel supporting structure and the main frame can be varied.

When the valve 54 is turned so that the slot 57 does not register with the passages 52 and 53, then there can be no flow therethrough from the chamber 31 to the chamber 32 or vice versa. In order to relieve the pressure developed by severe shocks occurring when this valve 54 is closed to the passages 52 and 53, I provide another circuit connecting with the passage 44 through means of the circular groove 56 around the valve 54. Communicating with the valve chamber 51 and the groove 56 is a passage 76 terminating in a chamber 77 closed at the exterior by an axially adjustable plug 78. This chamber communicates with the passage 45 which forms a continuation of passage 43. Another passage 79 leads from the passage 76 to a chamber 80 which is closed at its outer end by an axially adjustable screw plug 81. The chambers 80 and 77 are connected by a passage 82. In the chamber 77 is a valve 83 having a head engageable with the shoulder of the casing forming the junction between the passage 76 and the chamber 77, such valve being normally seated by a coil spring 84. A valve 85 normally engages the shoulder forming the junction between the passage 82 and the chamber 80, such valve being normally seated by the coil spring 86.

It will be observed that the valves 83 and 85 close in opposite directions and hence fluid flowing from the chamber 31 will move from the passage 45 into the chamber 77 through the passage 82, the chamber 80, and the passages 79 and 76 where it will move into the passage 44 around the groove 56 in the valve 54. The fluid flowing from the chamber 32 to the chamber 31 will move through the passages 42 and 44, around the groove 56 in the valve 54 into the passage 76, past the valve 83 into the chamber 77, and through the passage 45 from which it will move into the chamber 31 through the passage 43. The springs 84 and 86 exert a high pressure to prevent opening of the associated valves so that high pressure by the pistons 33 and 34 will be required in order to open the valves 83 and 85 to establish communication between the chambers 31 and 32. This circuit, as before explained, is in reality a relief effective when the flow is cut off through the normal circuit due to shutting off communication between the passage 44 and the passages 52 and 53.

Mechanism is associated with the valve 71 so that it can be regulated from the dash. On the end 75 of the valve extending from the casing is fixed an arm 87 and pivoted to such arm is a link 88 extending rearwardly to arm 89 fixed on a rotatable cross shaft 90 mounted between the frame side sills 10. An operating lever 91 is fixed to the shaft 90 and a link 92 connects such lever with a bell crank lever 93 mounted on the dash. Another link 94 connects this bell crank lever with a second bell crank lever 95 which is mounted on the dash above the first bell crank lever. An operating rod 96 extends through the dash 96', within grasp of the driver of the vehicle, and is connected to the bell crank lever 95 so that, upon reciprocation, the linkage between the bell crank lever 95 and the arms 87 of the front shock absorbers will be moved to turn the shaft 71. The fluid flow through passage 53 is thus regulated to vary the resistance to vertical movement of the wheel supporting structures and the frame relatively. Such mechanism is commonly known as the "ride control" for motor vehicles.

The valve 54 is controlled by the brake operating mechanism and the arrangement is such that when the brakes are applied, the valves 54 will be turned so that flow between the passage 44 and the passages 52 and 53 is cut off. With the present type of suspension mechanism, there is considerable resiliency at the front end of the vehicle which results in the frame diving downwardly toward the front wheel supporting structures when the brakes are applied. Through means of the control valves 54, the shock absorber resistance will be made such as to substantially eliminate this diving, there being provision made for relief in the shock absorbers in case extraordinary pressure is developed therein due to the wheels encountering a sharp unevenness in the road while the valves 54 are closed. Each of the road wheels is equipped with a brake drum, as indicated at 97, and within each of these drums is a conventional type of expanding and contracting band 98 controlled by a cam member, as indicated at 99. These cam control members are mounted on shafts 100 which have arms 101 extending therefrom connected with brake rods 102. The front and rear brake rods at each side of the vehicle are connected to a lever 103 fixed on a rotatable cross shaft 104 carried by the side sills of the main frame. A pedal 105 is mounted on a shaft 106 carried by one of the side sills and link 107 connects the pedal with arm 108 fixed on shaft 104 and a spring 112 connected to the pedal and a side sill manually maintains the brake mechanism in released position. Control arms 109 are fixed to the front brake rods 102 and extend forwardly therefrom where they are pivotally connected with arms 110 fixed to the projecting ends 55 of the valves 54.

As the front brake rods 102 are reciprocated by operation of the pedal, they transfer similar motion to the rods 109 which in turn move the arms 110 therewith and thus turn the valves 54. When the brakes are released, the slot 57 in the valves will be open to the passages 52 and 53 but, when the brakes are applied, the valves 54 will be turned so that the slots 57 no longer communicate with the passages 52 and 53 and therefore flow therethrough between the chambers 31 and 32 is cut off. Under such circumstances, the shock absorbers become substantially rigid structures and will prevent vertical movement of the wheel supporting structures and the main frame relatively so that diving of the main frame toward the wheel supporting structures is substantially eliminated upon application of the brakes.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a road vehicle, suspension means including fluid shock absorbers having flow control valves, brake actuating mechanism, and means connecting the brake mechanism with the control valves, said connecting means regulating the valves to restrict fluid flow in the shock absorbers upon brake applying operation of the mechanism.

2. A fluid shock absorber comprising a casing, fluid containing chamber means in the casing, piston means movable in the chamber means, operating means for the piston means extending exteriorly of the casing, a fluid connection in the casing between the remote ends of the chamber means, valve means in the casing operable to establish or shut off fluid flow through the connection, a pressure relief by-pass communicating with the connection allowing a limited fluid flow between the chamber ends when the valve closes the connection, and brake control mechanism connected to actuate said valve means.

3. A fluid shock absorber comprising a casing, fluid containing chamber means in the casing, piston means movable in the chamber means, operating means for the piston means extending exteriorly of the casing, a fluid connection between the remote ends of the chamber means, valve means associated with the connection to establish or shut off flow therethrough, and brake control mechanism connected to actuate said valve means.

4. A fluid shock absorber comprising a casing, fluid containing chamber means in the casing, piston means movable in the chamber means, operating means for the piston means extending exteriorly of the casing, a fluid connection in the casing between the remote ends of the chamber means, valve means in the casing operable to establish or shut off fluid flow through the connection, a by-pass in the casing communicating with the connection, valve means in the by-pass operable by high fluid pressure in either direction to establish flow through the by-pass, and brake control mechanism connected to actuate said valve means.

5. A fluid shock absorber comprising a casing, fluid containing chamber means in the casing, piston means movable in the chamber means, operating means for the piston means extending exteriorly of the casing, a fluid connection in the casing between the remote ends of the chamber means through which fluid flows between the chambers, valve means in the casing operable to establish or shut off fluid flow through said connection, passage means in the casing communicating with the connection to provide a relief around said valve when shut off, spring pressed valve means closing in two directions and opening in response to high fluid pressure, and mechanism responsive to checking and releasing of the vehicle speed to control said valve means.

6. A fluid shock absorber comprising a casing, fluid containing chamber means in the casing, piston means movable in the chamber means, operataing means for the piston means extending exteriorly of the casing, a fluid connection in the casing between the remote ends of the chamber means, valve means in the casing operable to establish or shut off fluid flow through the connection, a second valve in said connection adjustable to regulate the volume of fluid flowing through said passage in a given length of time when the first mentioned valve is open, and brake applying mechanism connected to control said valve means.

7. A fluid shock absorber structure comprising a casing, fluid containing chamber means in the casing, piston means movable in the chamber means, operating means for the piston means extending exteriorly of the casing, a fluid connection in the casing between the remote ends of the chamber means, valve means extending into the casing turnable to establish or shut off fluid flow through the connection, and brake applying mechanism connected to the portion of said valve means extending exteriorly of the casing and operable to turn the same.

8. A hydraulic shock absorber for a vehicle having a braking system actuated by a brake lever, comprising, in combination, means for circulating fluid within the shock absorber; devices, each responsive to a different degree of fluid pressure to permit fluid circulation; and means actuated by the brake lever for rendering effective only that device which requires the greatest degree of fluid pressure to provide for fluid circulation during the application of braking forces.

9. A hydraulic shock absorber for a vehicle having a braking system actuated by a brake lever, comprising, in combination, means for circulating fluid within the shock absorber; valves for controlling fluid flow; a control valve normally permitting fluid to flow to all of said valves, but adapted to be actuated by the brake lever, when applying braking forces, to shut off the fluid flow to certain of said valves.

10. A hydraulic shock absorber for a vehicle having a braking system actuated by a brake lever, comprising, in combination, means for circulating fluid within the shock absorber; devices, each adapted to offer a different degree of restriction to fluid circulation; and means actuated by the brake lever when applying braking forces, for rendering effective only those two devices which offer the two greatest degrees of restriction to the flow of fluid.

11. A hydraulic shock absorber for a vehicle having a braking system actuated by a brake lever, comprising, in combination, means for circulating fluid within the shock absorber; fluid flow control devices adapted to be actuated to permit fluid circulation at different fluid pressures; and means normally directing fluid to all of said devices, but adapted to be actuated by the brake lever when applying braking forces, to shut off fluid flow to certain of the low pressure fluid flow control devices.

12. A hydraulic shock absorber for a vehicle having a braking system actuated by a brake lever, comprising, in combination, means for circulating fluid within the shock absorber; a plurality of fluid flow control devices adapted, in response to fluid pressure, to permit fluid circulation, certain of said devices acting in response to a low fluid pressure, others in response to a higher fluid pressure and still others in response to a still higher fluid pressure; and means adapted to be actuated by the brake lever, when applying braking forces, to permit fluid to flow only to those devices requiring the two highest degrees of fluid pressure to permit fluid circulation.

13. A hydraulic shock absorber for a vehicle having a braking system actuated by a brake lever, comprising, in combination, means for circulating fluid within the shock absorber; spring loaded valves for restricting fluid circulation; and a valve, normally rendering all of the spring loaded valves effective; but adapted to be actuated by the brake lever to render some of said spring loaded valves ineffective.

14. A hydraulic shock absorber for a vehicle having a braking system actuated by a brake lever, comprising, in combination, means for circulating fluid within the shock absorber; a plurality of spring loaded valves, certain of which restrict fluid flow to a greater degree than others; and a valve normally directing fluid flow to all of said valves, but adapted to be actuated by the brake lever to permit fluid to flow to only two of said valves.

15. A hydraulic shock absorber for a vehicle having a braking system actuated by a brake lever, comprising, in combination, means for circulating fluid within the shock absorber; valves for controlling fluid circulation; springs urging said valves into fluid flow restricting positions, certain of said springs exerting a greater pressure upon their respective valves than others; and a fluid flow controlling valve, normally directing fluid flow to all of the valves, but adapted to be actuated by the brake lever when moved to brake applying position, to direct fluid flow only to the two valves having the springs which exert the greatest pressure.

16. A hydraulic shock absorber for a vehicle having a braking system actuated by a brake lever, comprising in combination, means for circulating fluid within the shock absorber; fluid flow control devices; brake pedal actuated means for rendering only certain of said devices effective; and manually operated means for modifying the control of the fluid flow by one of said devices.

17. A hydraulic shock absorber for a vehicle having a braking system actuated by a brake lever, comprising, in combination, means for circulating fluid within the shock absorber; a plurality of fluid flow control devices, each adapted to permit fluid circulation in response to a different degree of fluid pressure; brake lever actuated means for shutting off fluid flow to the devices requiring a fluid pressure below a predetermined degree to open them, while braking forces are being applied by said lever, and manually actuated means for modifying the flow of fluid to one of said devices when the brake lever controlled means is open.

18. A hydraulic shock absorber for a vehicle having a braking system actuated by a brake lever, comprising, in combination, means for circulating fluid within the shock absorber; a plurality of spring loaded valves, adapted to be actuated at different fluid pressures to permit fluid circulation; a control valve adapted to be actuated manually to modify the flow of fluid to one of the lighter pressure valves; and another control valve adapted to be actuated by the brake lever when applying braking forces, for discontinuing the flow of fluid to the first mentioned control valve and to all excepting two of the heaviest pressure spring loaded valves.

19. A hydraulic shock absorber for a vehicle having a braking system actuated by a brake lever, said shock absorber being adapted to control the approaching and separating movements of the vehicle frame and wheel suspension, comprising, in combination, a casing providing a cylinder in which a piston forms two fluid displacement chambers; ducts connecting said chambers; means for controlling the flow of fluid through said ducts in response to pressure upon the fluid in one of said chambers; other means in the ducts for controlling the flow of fluid therethrough in response to the pressure upon the fluid in the other of said chambers; means normally rendering all of said means in said ducts effective to permit fluid flow from their respective displacement chambers, but adapted to be actuated to shut off the fluid flow through certain ducts and permit fluid to flow from each displacement chamber to only one fluid flow controlling means of said chamber, in response to the operation of the brake lever to apply braking forces.

20. A hydraulic shock absorber for a vehicle having a braking system actuated by a brake lever, said shock absorber being adapted to control the approaching and separating movements of the vehicle frame and wheel suspension, comprising, in combination, a casing providing a cylinder in which a piston forms two fluid displacement chambers; ducts connecting said chambers; fluid flow controlling devices in said ducts, adapted, in response to predetermined fluid pressures in said chambers, to provide for the transfer of fluid between the chambers; and means normally maintaining all of said devices in the fluid circuits, but adapted to be actuated by the brake lever when braking forces are applied, to shut off fluid flow to all but two of said devices, said two including a fluid flow control device for each displacement chamber.

21. A hydraulic shock absorber for a vehicle having a braking system actuated by a brake lever, said shock absorber being adapted to control the approaching and separating movements of the vehicle frame and wheel suspension, comprising, in combination, a casing providing a cylinder in which a piston forms two fluid displacement chambers; ducts connecting said chambers; fluid flow controlling devices in said ducts, adapted, in response to predetermined fluid pressures in said chambers, to provide for the transfer of fluid between the chambers; certain of said devices requiring greater fluid pressure than others to render them effective to provide fluid flow; and means normally directing fluid flow to all of said devices, but adapted to be actuated by the brake lever when applying braking forces, to shut off fluid flow to the devices requiring the lesser fluid pressures to open them and direct fluid flow from each displacement chamber to a device requiring the greatest fluid pressure to open it.

22. A hydraulic shock absorber for a vehicle having a braking system actuated by a brake lever, said shock absorber being adapted to control the approaching and separating movements of the vehicle frame and wheel suspension, comprising, in combination, a casing providing a cylinder in which a piston forms two fluid displacement chambers; the first in which the fluid has pressure exerted upon it as the wheel suspension and vehicle frame move toward each other on the compression stroke and the second in which pressure is exerted upon the fluid upon the reverse movement of the wheel suspension and frame or rebound stroke; ducts connecting said chambers; two fluid flow control devices normally preventing fluid flow from the first into the second displacement chamber one of said devices opening to permit fluid flow at a lower fluid pressure in said first chamber than the other; a plurality of fluid flow control devices normally preventing fluid flow from the said second into the said first displacement chamber, each device requiring a different fluid pressure in said second chamber to open it; and means, normally maintaining all of said ducts open, but adapted to be actuated by the brake lever when it is moved to apply braking forces, to keep open only such ducts that lead from each displacement chamber to its fluid flow control device requiring the greatest fluid pressure to open it.

23. A hydraulic shock absorber for a vehicle having a braking system actuated by a brake lever, said shock absorber being adapted to control the approaching and separating movements of the vehicle frame and wheel suspension, comprising, in combination, a casing providing a cylinder in which a piston forms two fluid displacement chambers; the first in which the fluid has pressure exerted upon it as the wheel suspension and vehicle frame move toward each other on the compression stroke and the second in which pressure is exerted upon the fluid upon the reverse movement of the wheel suspension and frame or rebound stroke; ducts connecting said chambers; two fluid flow control devices normally preventing fluid flow from the first into the second displacement chamber one of said devices opening to permit fluid flow at a lower fluid pressure in said first chamber than the other; a plurality of fluid flow control devices normally preventing fluid flow from the said second into the said first displacement chamber, each device requiring a different fluid pressure in said second chamber to open it; a valve adapted to be actuated manually to modify the fluid flow from the said second chamber to the fluid flow control device, requiring the least pressure in said chamber to permit a fluid flow therefrom; and a brake lever actuated valve, for controlling the fluid flow between the chamber whereby fluid from each chamber is directed only to the fluid flow control device of each chamber that requires the greatest fluid pressure to permit a flow from the respective chamber during the application of braking forces.

24. A hydraulic shock absorber for a vehicle having a braking system actuated by a brake lever, comprising, in combination, means for circulating fluid within the shock absorber; fluid flow control devices, means normally rendering all of said devices effective, but adapted to be actuated by the brake lever when applying braking forces, to render certain of said devices ineffective to control fluid flow.

25. A hydraulic shock absorber for a vehicle having a braking system actuated by a brake lever, comprising, in combination, means for circulating fluid within the shock absorber; means for controlling said fluid circulation; and means adapted to be actuated by the brake lever for rendering only certain of said controlling means effective to permit fluid circulation.

26. In combination a vehicle brake, a wheel motion damper, and interconnecting means between the brake and the damper for changing the rate of damping when applying the brake.

27. In combination a vehicle brake, a hydraulic shock absorber, and interconnecting means between the brake and the shock absorber for changing the damping rate when applying the brake.

WALTER R. GRISWOLD.